(12) United States Patent
Murakami

(10) Patent No.: US 6,831,432 B2
(45) Date of Patent: Dec. 14, 2004

(54) MOTOR DRIVING DEVICE AND MOTOR DRIVING METHOD

(75) Inventor: Maki Murakami, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

(21) Appl. No.: 10/307,983

(22) Filed: Dec. 3, 2002

(65) Prior Publication Data

US 2003/0102833 A1 Jun. 5, 2003

(30) Foreign Application Priority Data

Dec. 5, 2001 (JP) ........................................ 2001-371459

(51) Int. Cl.[7] .............................. H02K 17/32; H02P 5/04
(52) U.S. Cl. ...................... 318/362; 318/364; 318/372; 318/373; 318/375; 318/430; 318/432; 318/434; 318/254
(58) Field of Search ................................ 318/362, 364, 318/372, 373, 375, 430–434, 138, 254, 439, 700, 721

(56) References Cited

U.S. PATENT DOCUMENTS

| | | | | | |
|---|---|---|---|---|---|
| 5,010,283 | A | * | 4/1991 | Kitajima et al. ............ | 318/373 |
| 5,184,049 | A | * | 2/1993 | Kiuchi ....................... | 318/362 |
| 5,186,305 | A | * | 2/1993 | Everett ....................... | 198/392 |
| 5,874,817 | A | * | 2/1999 | Yashita et al. .............. | 318/439 |
| 6,154,002 | A | * | 11/2000 | Izumisawa et al. ......... | 318/721 |
| 6,531,839 | B1 | * | 3/2003 | Shin et al. .................. | 318/371 |
| 6,605,912 | B1 | * | 8/2003 | Bharadwaj et al. ......... | 318/439 |

FOREIGN PATENT DOCUMENTS

| | | | | |
|---|---|---|---|---|
| EP | 1318596 A2 | * | 4/2004 | ............. H02P/6/24 |
| JP | 03219203 A | * | 9/1991 | ............. G02B/7/08 |
| JP | 06113576 A | * | 4/1994 | ............. H02P/3/00 |
| JP | 06-169594 | | 6/1994 | |
| JP | 2003235287 A | * | 8/2003 | ............. H02P/6/24 |

* cited by examiner

Primary Examiner—David Martin
Assistant Examiner—Tyrone Smith
(74) Attorney, Agent, or Firm—McDermott Will & Emery LLP

(57) ABSTRACT

Brake mode switching signal production means detects the number of revolutions per unit time of a rotor according to a change in a positional relationship between motor windings of a plurality of phases and the rotor so as to output first and second brake mode switching signals for selecting either a short brake mode or a reverse brake mode for braking the rotation of the rotor based on the number of revolutions. Control means outputs an energization control signal for controlling energization of the motor windings of a plurality of phases in response to the first and second brake mode switching signals. Thus, it is possible to reduce the braking noise and the stopping time.

7 Claims, 10 Drawing Sheets

US 6,831,432 B2

MOTOR DRIVING DEVICE AND MOTOR DRIVING METHOD

BACKGROUND OF THE INVENTION

The present invention relates to a motor driving device and a motor driving method capable of applying a short brake and a reverse brake to a motor.

A motor can be stopped by decelerating the motor with a short brake or with a reverse brake. A conventional motor driving device has a short brake mode in which a short brake is applied to the motor and a reverse brake mode in which a reverse brake is applied to the motor, one of which is selected for deceleration and stopping of the motor.

In the short brake mode, the motor is decelerated by forming a short circuit between the terminals of motor windings of three phases. In the reverse brake mode, the motor is decelerated by applying a reverse current through motor windings of a plurality of phases to excite the motor windings in the reverse direction.

FIG. 9 is a diagram illustrating a configuration of a conventional motor driving device 1E.

Referring to FIG. 9, the motor driving device 1E includes position detection means 10, energization switching signal production means 20, rotation control means 30, brake command generation means 40, brake mode switching means 50D, reverse rotation detection means 60, energization control signal production means 70D, and power transistors Q1 to Q6. A motor M1 provided outside the motor driving device 1E includes a rotor r1, and motor windings L1 to L3 for rotating a disk d1 via the rotor r1.

The operation of the conventional motor driving device 1E will now be described below in detail.

FIG. 10 is a diagram illustrating an internal configuration of the brake mode switching means 50D illustrated in FIG. 9.

During normal rotation of the motor M1, torque command generation means 41 provided in the brake command generation means 40 outputs a torque command signal S2 based on a rotation control signal S1 from the rotation control means 30. The energization switching signal production means 20 receives the torque command signal S2 and outputs, to the energization control signal production means 70D, an energization switching signal S4 having a level according to that of the torque command signal S2 for energizing the motor windings of a plurality of phases with an energization angle that is determined based on a position signal S3 from the position detection means 10. The energization control signal production means 70D successively energizes the power transistors Q1 to Q6 based on the energization switching signal S4. The rotation control means 30 may be a microcomputer, for example. As the position signal S3 is received from the position detection means 10, the microcomputer counts the number of cycles of the received position signal S3 to obtain count data, and compares the obtained count data with reference data stored therein that corresponds to the number of revolutions per unit time, so as to output the rotation control signal S1 according to the comparison result. The torque command generation means 41, which may be a smoothing circuit, outputs a DC voltage, which is obtained by smoothing the rotation control signal S1, as the torque command signal S2.

The brake command generation means 40 outputs a brake command signal S5 based on the rotation control signal S1 from the rotation control means 30. Then, the brake mode switching means 50D, which includes logic circuits 511d and 512d as illustrated in FIG. 10, receives the brake command signal S5 and a brake mode switching signal S11, and selects one of the short brake mode and the reverse brake mode.

In a case where the short brake mode is selected, the brake mode switching means 50D selectively outputs a short brake signal /S7 based on the brake mode switching signal S11. The energization control signal production means 70D receives the energization switching signal S4 from the energization switching signal production means 20 and the short brake signal /S7 to output an energization control signal S8 to the power transistors Q1 to Q6. Based on the energization control signal S8, the power transistors Q1, Q3 and Q5 may be all turned ON, with the power transistors Q2, Q4 and Q6 being all turned OFF. Alternatively, the power transistors Q2, Q4 and Q6 may be all turned ON, with the power transistors Q1, Q3 and Q5 being all turned OFF, to form a short circuit between the terminals of the motor windings L1, L2 and L3 of three phases so that a counter electromotive voltage is consumed in the motor windings L1, L2 and L3, thereby decelerating and stopping the motor M1.

In a case where the reverse brake mode is selected, the brake mode switching means 50D selectively outputs a reverse brake signal S7 based on the brake mode switching signal S11. The energization control signal production means 70D receives the energization switching signal S4 from the energization switching signal production means 20 and the reverse brake signal S7 to output the energization control signal S8 of the reverse polarity to the power transistors Q1 to Q6. The power transistors Q1 to Q6 apply the energization control signal S8 of the reverse polarity to the motor windings L1, L2 and L3 of the three phases so as to excite the motor windings L1, L2 and L3 in the reverse direction, thereby braking the rotor r1.

In such a case, the reverse rotation detection means 60 detects a reverse rotation by, for example, detecting the cycle of the output signal from the position detection means 10 using a timer, or the like. Specifically, the reverse rotation detection means 60 determines that the motor is standing when detecting that the cycle of the position signal S3 from the position detection means 10 is equal to or greater than a predetermined value, and outputs a reverse rotation signal S9 assuming that the motor is about to start rotating in the reverse direction. When receiving the reverse rotation signal S9, the energization control signal production means 70D stops supplying the energization control signal S8 to all the motor windings L1, L2 and L3. Then, the motor M1 comes to a complete stop after continuing to rotate with the force of inertia.

As described above, the conventional motor driving device brakes the motor M1 by selecting either one of the short brake mode and the reverse brake mode. The short brake mode is advantageous in that the motor M1 makes substantially no braking noise, and is effective during high-speed rotation because the braking force in this mode is dependent on the counter electromotive voltage. However, the braking force decreases as the number of revolutions decreases, thereby taking a long time for the motor to come to a complete stop.

On the other hand, the reverse brake mode provides a large braking force because the motor windings L1 to L3 are excited in the reverse direction while decelerating the motor. However, during high-speed rotation, the motor makes substantial noise due to a phase shift. Moreover, it is difficult to detect a reverse rotation with a high precision, and if the control fails to stop the energization control signal S8 of the reverse polarity at an appropriate timing, the reverse excitation continues for a while even after the motor M1 stops, whereby the motor M1 starts rotating in the reverse direction. Although the energization control signal production means 70D thereafter stops energizing the motor windings L1 to L3 of the three phases, the motor M1 will continue to rotate for a while with the force of inertia. Therefore, it takes a long time for the motor to come to a complete stop, and causes an error in the position at which the motor M1 stops.

SUMMARY OF THE INVENTION

It is an object of the present invention to provide a motor driving device and a motor driving method capable of stopping a motor while reducing the braking noise and the stopping time.

Specifically, a motor driving device of the present invention includes: brake mode switching signal production means for detecting the number of revolutions per unit time of a rotor according to a change in a positional relationship between motor windings of a plurality of phases and the rotor so as to output a brake mode switching signal for selecting either a short brake mode or a reverse brake mode for braking the rotor based on the number of revolutions; and control means for outputting an energization control signal for controlling energization of the motor windings of a plurality of phases in response to the brake mode switching signal.

In this way, it is possible to switch brake modes from one to another according to the number of revolutions of the motor. Therefore, it is possible to reduce the braking noise and the stopping time. Moreover, it is less likely that an error occurs in the position at which the motor stops.

Another motor driving device of the present invention includes: position detection means for outputting a position signal representing a positional relationship between motor windings of a plurality of phases and a rotor; rotation detection means for outputting a detection signal according to a number of revolutions per unit time of the rotor; rotation control means for outputting a rotation control signal for controlling rotation of the rotor; brake command generation means for outputting a torque command signal according to the rotation control signal upon receiving the rotation control signal and for outputting a brake command signal for applying a short brake or a reverse brake to the rotation of the rotor; energization switching signal production means for outputting an energization switching signal having a level according to that of the torque command signal for energizing the motor windings of a plurality of phases with an energization angle that is determined based on the position signal; rotation determination means for comparing the number of revolutions per unit time detected by the rotation detection means with a predetermined number of revolutions, by using signals that are equivalent to the numbers of revolutions, to output a brake mode switching signal for selecting either the short brake or the reverse brake; brake mode switching means for selecting either one of the brake modes based on the brake command signal and the brake mode switching signal and outputting a brake mode command signal indicating selected brake mode; energization control signal production means for outputting an energization control signal for controlling energization of the motor windings of a plurality of phases based on the brake command signal, the brake mode command signal and the energization switching signal; and a plurality of transistors for supplying a power to the motor windings of a plurality of phases according to the energization control signal.

In this way, it is possible to switch brake modes from one to another according to the number of revolutions of the motor. Therefore, it is possible to reduce the braking noise and the stopping time. Moreover, it is less likely that an error occurs in the position at which the motor stops. Furthermore, since the predetermined number of revolutions to be the switching reference can be set arbitrarily, it is possible to control the amount of time required for the motor to come to a complete stop.

It is preferred that the motor driving device further includes clock signal production means for producing a clock signal having a predetermined frequency and a predetermined duty ratio, wherein the brake mode switching means further receives the clock signal to output the brake mode command signal based also on the clock signal.

It is preferred that the motor driving device further includes: current value detection means for detecting a value of a current flowing through the motor windings of a plurality of phases; and current value determination means for comparing a detection signal from the current value detection means with a predetermined reference value to output, to the brake mode switching means, a current value determination signal whose signal level transitions according to the comparison result, wherein the brake mode switching means outputs the brake mode command signal at a timing that is determined according to the current value determination signal.

It is preferred that the motor driving device further includes OFF signal production means for outputting an OFF signal, which is a pulse having a predetermined cycle, when receiving the brake mode switching signal, wherein when receiving the OFF signal output from the OFF signal production means, the energization control signal production means outputs an energization control signal to the plurality of transistors for temporarily stopping a current supply to the motor windings of a plurality of phases according to the OFF signal.

A motor driving method of the present invention includes: motor windings of a plurality of phases; a rotor; a plurality of transistors for driving the motor windings of a plurality of phases; and a control circuit for detecting a number of revolutions per unit time of the rotor according to a change in a positional relationship between the motor windings of a plurality of phases and the rotor so as to control a braking operation of the plurality of transistors, wherein the control circuit performs a short brake control of shorting terminals of the motor windings of a plurality of phases with one another while a rotational speed of the rotor is a first rotational speed, a reverse brake control of applying a reverse driving current to the motor windings of a plurality of phases while the rotational speed of the rotor is a second rotational speed that is lower than the first rotational speed, and then the short brake control again while the rotational speed of the rotor is a third rotational speed that is lower than the second rotational speed.

Thus, while the number of revolutions is the first number of revolutions, the short brake control is used, thereby reducing noise that is generated when decelerating the motor from a high-speed rotation. While the number of revolutions is the second number of revolutions, the reverse brake control is used, thereby quickly decreasing the rotational speed of the motor. While the number of revolutions is the third number of revolutions, the short brake control is used again, whereby the motor can be brought to a complete stop within a short period of time, and it is possible to stop the motor at an accurate position without having to detect a reverse rotation as is necessary in the prior art.

Another motor driving method of the present invention includes: motor windings of a plurality of phases; a rotor; a plurality of transistors for driving the motor windings of a plurality of phases; and a control circuit for detecting a number of revolutions per unit time of the rotor according to a change in a positional relationship between the motor windings of a plurality of phases and the rotor so as to control a braking operation of the plurality of transistors, wherein the control circuit performs a short brake control of shorting terminals of the motor windings of a plurality of phases with one another while a rotational speed of the rotor is a first rotational speed, a mixed brake control in which the short brake control and a reverse brake control of applying a reverse driving current to the motor windings of a plurality of phases are repeatedly switched from one to another based on a clock signal having a predetermined cycle and a predetermined duty ratio while the rotational speed of the rotor is a second rotational speed that is lower than the first rotational speed, and then the short brake control again while the rotational speed of the rotor is a third rotational speed that is lower than the second rotational speed.

Thus, while the number of revolutions is the second number of revolutions, the mixed brake control in which the short brake control and the reverse brake control are repeatedly switched from one to another is performed, thereby realizing a smooth transition from the short brake control for the first number of revolutions to the next brake control for the second number of revolutions. Thus, it is possible to reduce noise that may otherwise occur at the brake mode transition.

It is preferred that a one-shot pulse is generated when switching the short brake control and the reverse brake control from one to another for turning OFF all of the plurality of transistors according to the one-shot pulse.

DETAILED DESCRIPTION OF THE INVENTION

Figure 1:
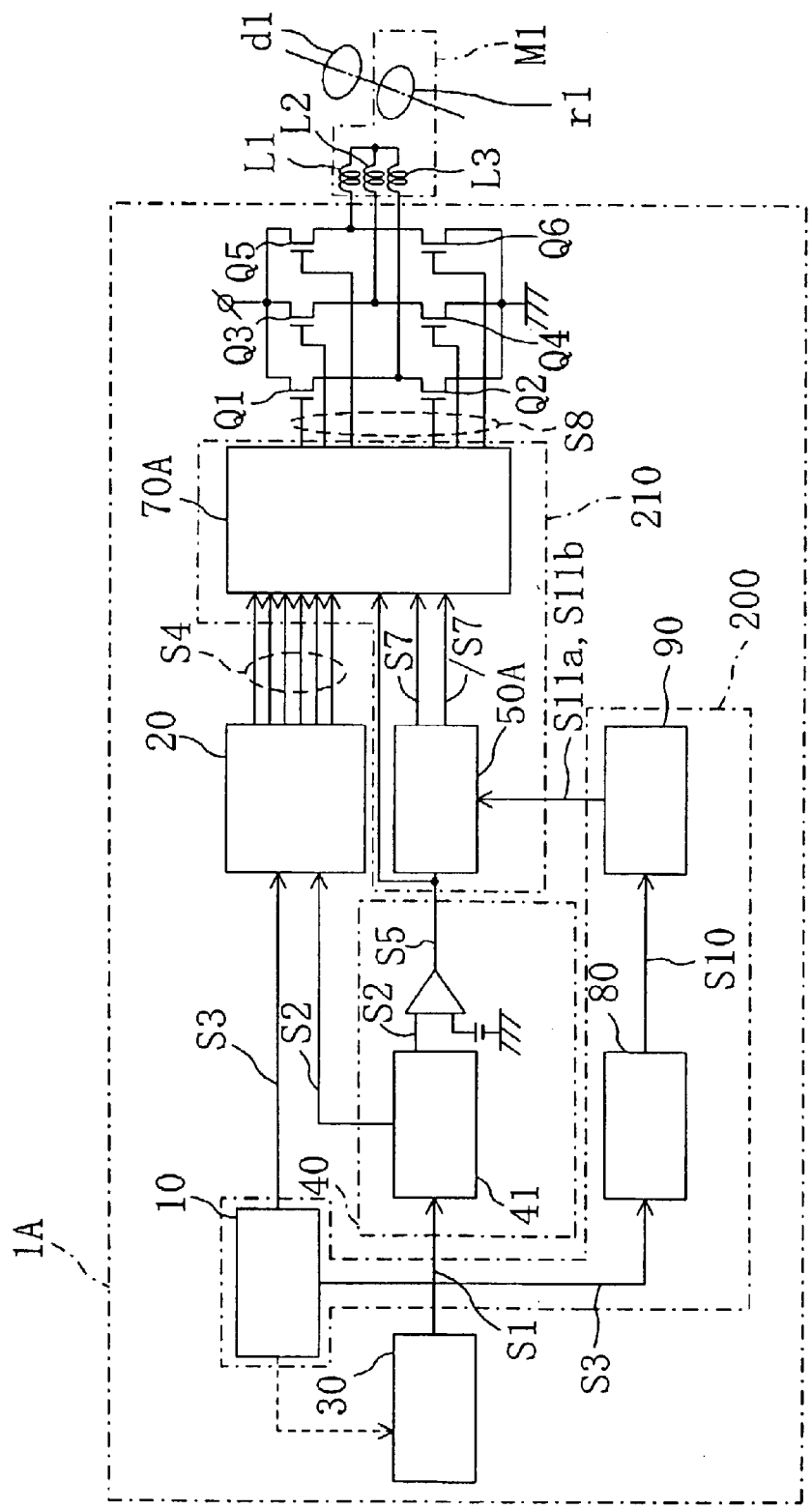
FIG. 1 is a diagram illustrating a configuration of a motor driving device according to a first embodiment of the present invention.

Various embodiments of the present invention will now be described with reference to the drawings.

Note that like elements are denoted by like reference numerals throughout the various drawings, including those that have been already referred to with respect to the conventional example above, and the description of such like elements will not be repeated.

First Embodiment

FIG. 1 is a diagram illustrating a configuration of a motor driving device 1A according to the first embodiment of the present invention.

As in the conventional example above, the motor driving device 1A illustrated in FIG. 1 includes position detection means 10, energization switching signal production means 20, rotation control means 30, brake command generation means 40, brake mode switching means 50A, energization control signal production means 70A, and power transistors Q1 to Q6. The motor driving device 1A further includes rotation detection means 80 and rotation determination means 90. The rotation detection means 80 detects the number of revolutions per unit time of a rotor r1 based on a position signal S3 output from the position detection means 10, and outputs a signal S10 representing the number of revolutions. The rotation determination means 90 determines whether or not the signal S10 output from the rotation detection means 80, which is equivalent to the number of revolutions per unit time of the rotor r1, has reached a reference value corresponding to a predetermined number of revolutions. A motor M1 provided outside the motor driving device 1A includes the rotor r1, and motor windings L1 to L3 for rotating a disk d1 via the rotor r1. Moreover, brake mode switching signal production means 200 illustrated in FIG. 1 includes the position detection means 10, the rotation detection means 80 and the rotation determination means 90. Furthermore, control means 210 includes the brake mode switching means 50A and the energization control signal production means 70A.

The operation of the motor driving device 1A having such a configuration will now be described. The rotation detection means 80 detects the number of revolutions of the rotor r1 based on the frequency of the position signal S3 output from the position detection means 10, and outputs the signal S10 representing the detected number of revolutions to the rotation determination means 90. Then, the rotation determination means 90 outputs, to the brake mode switching means 50A, a first brake mode switching signal S11a (corresponding to the "brake mode switching signal") and a second brake mode switching signal S11b (corresponding to the "brake mode switching signal") each having a signal level that transitions when the signal S10 from the rotation detection means 80 becomes less than or equal to a reference value corresponding to a predetermined number of revolutions. When receiving the first and second brake mode switching signals S11a and S11b from the rotation determination means 90 and a brake command signal S5 from the brake command generation means 40, the brake mode switching means 50A produces and outputs a reverse brake signal S7 (corresponding to the "brake mode command signal") and a short brake signal /S7 (corresponding to the "brake mode command signal"). When receiving the reverse brake signal S7 and the short brake signal /S7, the energization control signal production means 70A outputs an energization control signal S8 to the power transistors Q1 to Q6 according to the selected brake mode, based on the energization switching signal S4 and the brake command signal S5.

The rotation detection means 80 and the rotation determination means 90 of the brake mode switching signal production means 200 will now be described with a more specific example.

The rotation detection means 80 can be a counter or an F/V converter. In a case where a counter is used as the rotation detection means 80, a decoder circuit is used as the rotation determination means 90. In such a case, the decoder circuit (rotation determination means 90) is connected to the output of the counter (rotation detection means 80). The counter (rotation detection means 80) detects a cycle that corresponds to the number of revolutions of the rotor r1 by counting the pulses of a predetermined clock signal while resetting the count according to an edge signal of a waveform represented by the position signal S3. The decoder circuit (rotation determination means 90) stores a predetermined decoded value (reference value) corresponding to a predetermined number of revolutions per unit time, and outputs the first, second brake mode switching signal (S11$a$, S11$b$) when the count of the counter (rotation detection means 80) reaches the decoded value.

In a case where an F/V converter is used as the rotation detection means 80, a voltage comparator is used as the rotation determination means 90. In such a case, the voltage comparator (rotation determination means 90) is connected to the output of the F/V converter (rotation detection means 80). The F/V converter (rotation detection means 80) converts the frequency of the position signal S3 to a voltage, and outputs the converted DC voltage. The voltage comparator (rotation determination means 90) connected to the output of the F/V converter (rotation detection means 80) compares a DC voltage (reference value) corresponding to a predetermined number of revolutions per unit time with the output voltage from the F/V converter (rotation detection means 80). When the output voltage from the F/V converter (rotation detection means 80) reaches the reference value, the voltage comparator (rotation determination means 90) outputs the first, second brake mode switching signal (S11$a$, S11$b$).

Figure 2:
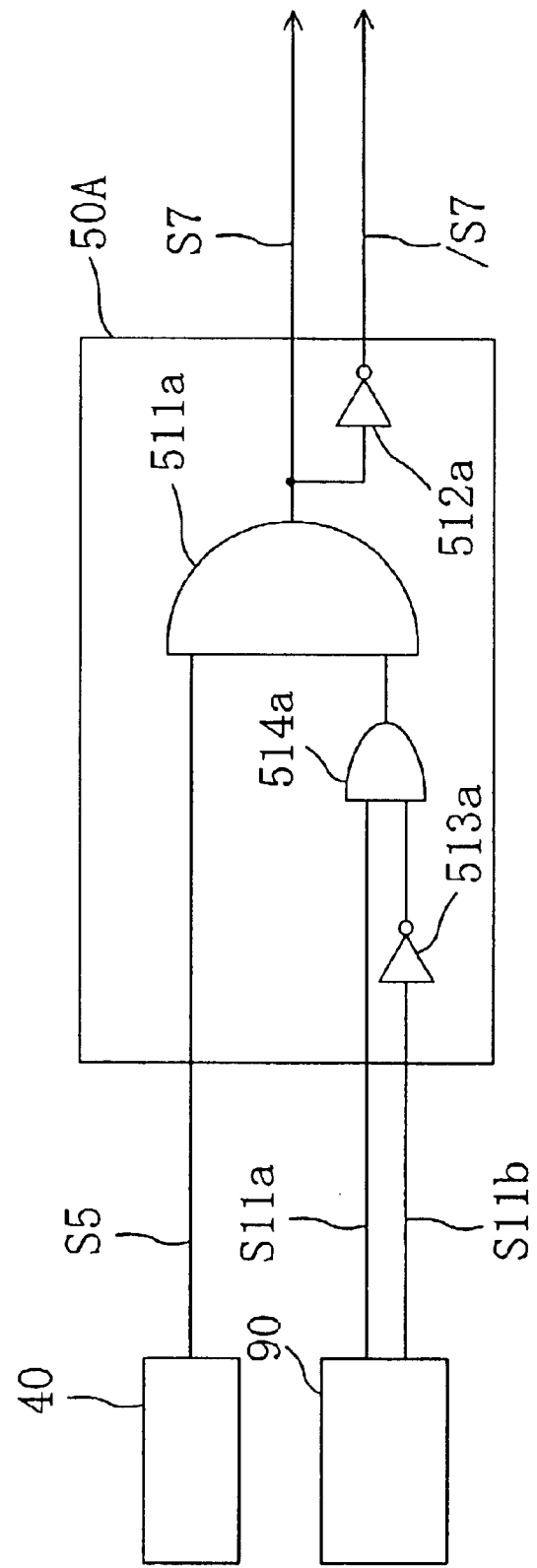
FIG. 2 is a diagram illustrating an internal configuration of brake mode switching means.

FIG. 2 is a diagram illustrating an internal configuration of the brake mode switching means 50A. The brake mode switching means 50A illustrated in FIG. 2 includes AND circuits 511$a$ and 514$a$, and inverters 512$a$ and 513$a$. The inverter 513$a$ inverts the second brake mode switching signal S11$b$ from the rotation determination means 90. The AND circuit 514$a$ outputs the logical product of the first brake mode switching signal S11$a$ from the rotation determination means 90 and the output from the inverter 513$a$. The AND circuit 511$a$ outputs, as the reverse brake signal S7, the logical product of the brake command signal S5 from the brake command generation means 40 and the output from the AND circuit 514$a$. The inverter 512$a$ inverts the reverse brake signal S7 from the AND circuit 511$a$ and outputs the inverted signal as the short brake signal /S7.

Figure 3:
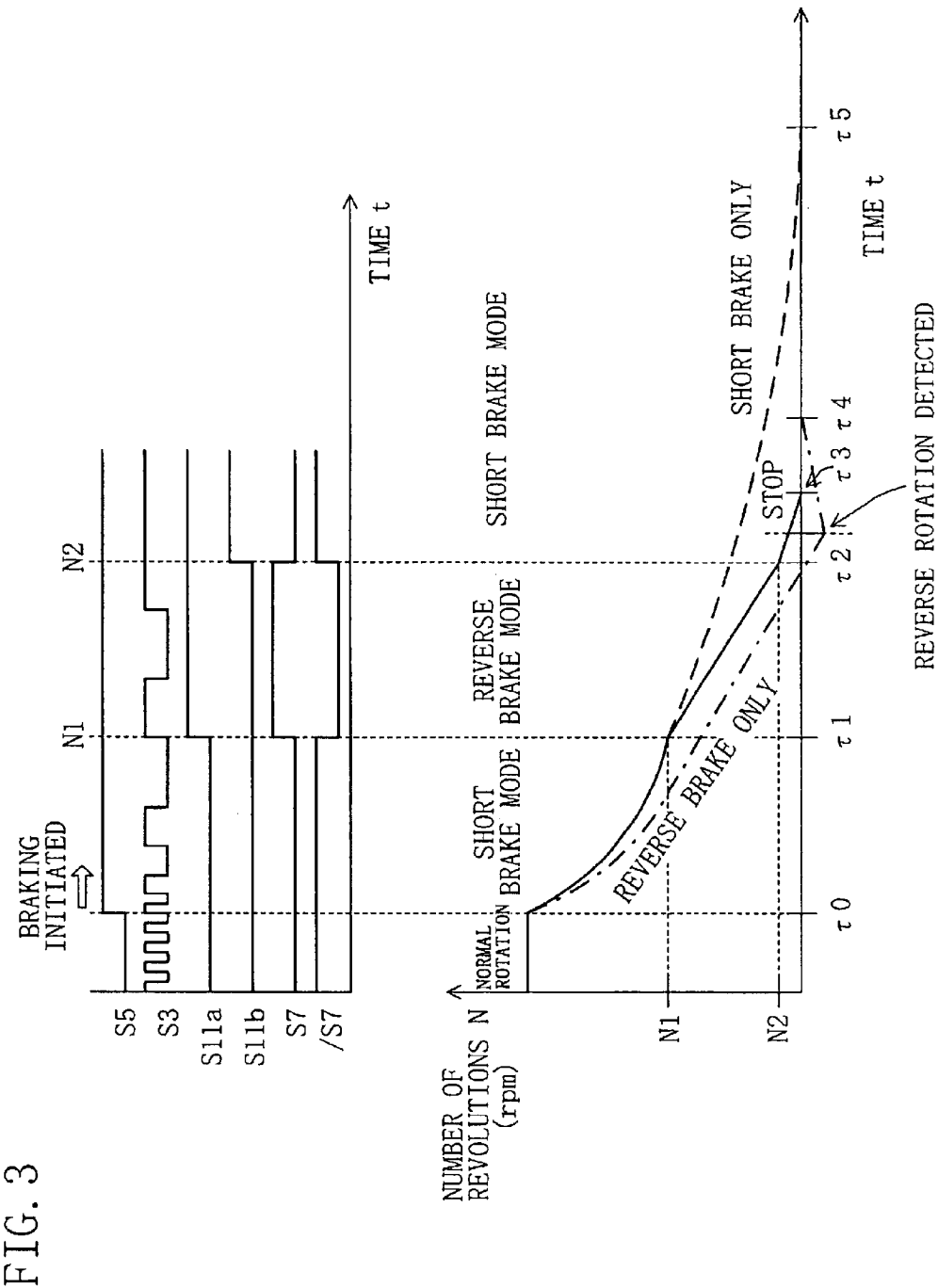
FIG. 3 is a timing chart illustrating a specific operation of a motor driving device.

FIG. 3 is a timing chart illustrating a specific operation of the motor driving device 1A of the present embodiment.

The brake mode switching signal production means 200 outputs the first brake mode switching signal S11$a$, which transitions to the H level when the number of revolutions per unit time becomes less than or equal to a predetermined number of revolutions N1 (i.e., at time $\tau$1), based on the position signal S3 from the position detection means 10. Similarly, the brake mode switching signal production means 200 outputs the second brake mode switching signal S11$b$, which transitions to the H level when the number of revolutions becomes less than or equal to a predetermined number of revolutions N2 (i.e., at time $\tau$2). The brake mode switching means 50A outputs the reverse brake signal S7 and the short brake signal /S7 based on the signals S11$a$ and S11$b$ from the rotation determination means 90.

Thus, as illustrated in FIG. 3, during a period from time $\tau$0 at which braking is initiated to time $\tau$1 at which the number of revolutions decreases to N1 (the number of revolutions during this period corresponds to the "first rotational speed"), the brake mode switching means 50A outputs the H-level short brake signal /S7 to the energization control signal production means 70A so as to select the short brake mode in which the noise level is low. Then, during the following period from time $\tau$1 at which the number of revolutions is N1 (i.e., a somewhat decreased, intermediate value) to time $\tau$2 at which the number of revolutions is N2 (i.e., immediately before coming to a complete stop) (the number of revolutions during this period corresponds to the "second rotational speed"), the brake mode switching means 50A outputs the H-level reverse brake signal S7 to the energization control signal production means 70A so as to select the reverse brake mode in which a large braking force is provided. Then, during the next period from time $\tau$2 at which the number of revolutions is N2 (i.e., immediately before the motor stops) to time $\tau$3 at which the motor stops (the number of revolutions during this period corresponds to the "third rotational speed"), the brake mode switching means 50A outputs the H-level short brake signal /S7 to the energization control signal production means 70A so as to select the short brake mode by which the rotor r1 does not rotate in the reverse direction.

As illustrated in FIG. 3, the motor does not come to a complete stop until time $\tau$4 or time $\tau$5 if either the reverse brake mode or the short brake mode is selected throughout the braking operation as in the prior art. In contrast, according to the present embodiment, the stopping time is reduced to $\tau$3. Moreover, during high-speed rotation (from $\tau$0 to $\tau$1), the short brake mode is selected, whereby the noise is reduced as compared with that in a case where the reverse brake mode is selected as in the prior art. Furthermore, during low-speed rotation (from $\tau$1 to $\tau$2), the reverse brake mode is selected, whereby the braking force can be increased as compared with that in a case where the short brake mode is selected as in the prior art. Moreover, immediately before coming to a complete stop (from $\tau$2 to $\tau$3), the short brake mode is selected, whereby the rotor r1 can be stopped without reverse rotation, unlike when the reverse brake mode is selected as in the prior art.

As described above, according to the present embodiment, the brake mode switching means 50A selectively uses the two brakes, i.e., the short brake and the reverse brake, based on the first and second brake mode switching signal S11$a$ and S11$b$ from the rotation determination means 90. Therefore, it is possible to reduce the braking noise and the stopping time. Moreover, in this way, it is less likely that an error occurs in the position at which the motor M1 stops. Furthermore, since the motor is brought to a complete stop by using the short brake, it is possible to save an amount of time that is required for detecting a reverse rotation as in the prior art where the motor is brought to a complete stop by using the reverse brake.

Note that since the predetermined value that is used for comparison in the rotation determination means 90 may be set arbitrarily, the amount of time and the number of times the short brake and the reverse brake are applied can be set arbitrarily. As a result, the stopping time can be varied arbitrarily. Moreover, for a braking operation starting from a number of revolutions that is less than or equal to a certain value, the braking operation may be started with the reverse brake.

Second Embodiment

Figure 4:
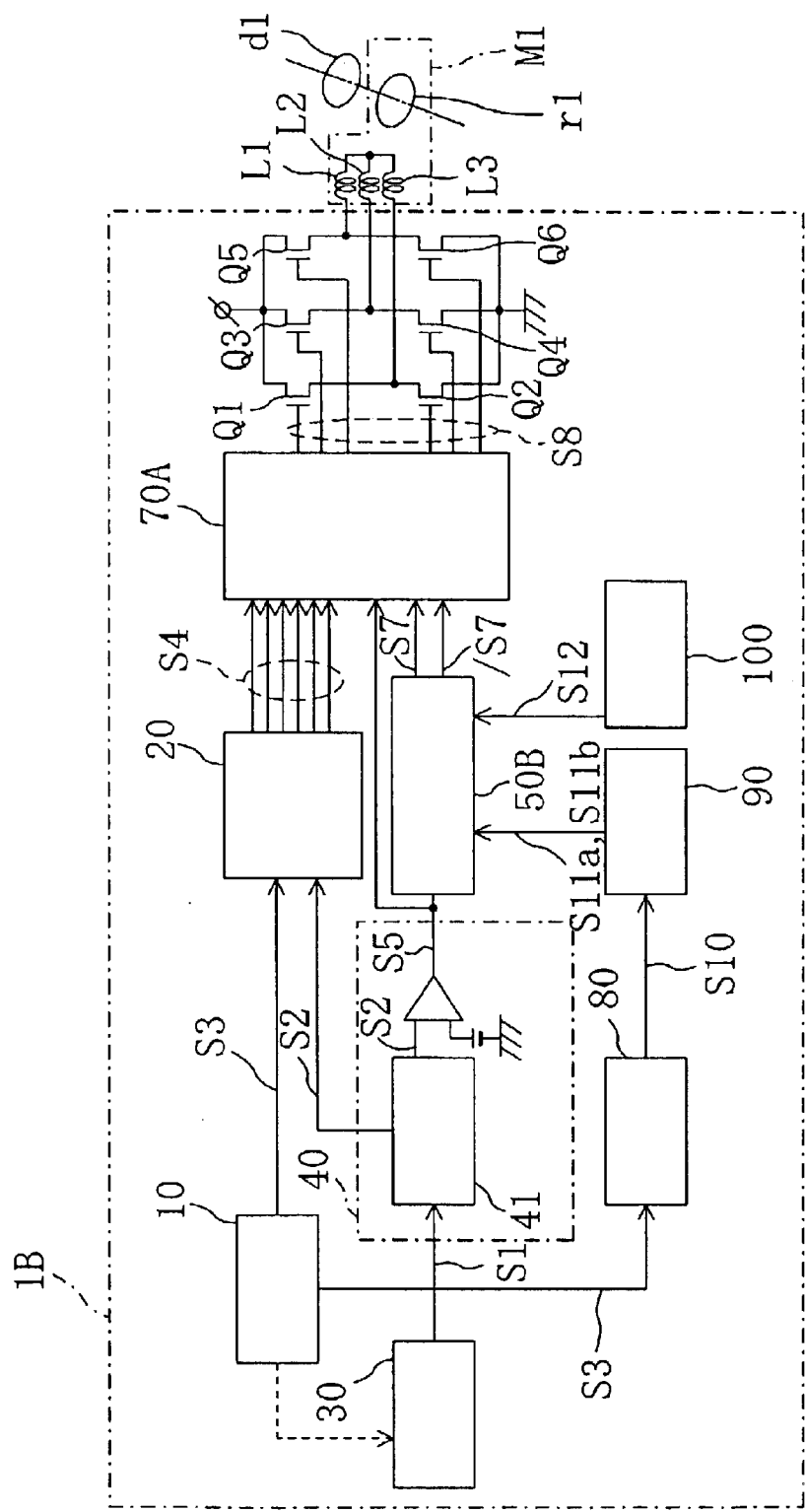
FIG. 4 is a diagram illustrating a configuration of a motor driving device according to a second embodiment of the present invention.

FIG. 4 is a diagram illustrating a configuration of a motor driving device 1B according to the second embodiment of the present invention.

In addition to the elements included in the motor driving device 1A illustrated in FIG. 1, the motor driving device 1B illustrated in FIG. 4 further includes clock signal production means 100 for supplying a clock signal S12, to brake mode switching means 50B, for switching the brake modes from one to another.

The operation of the motor driving device 1B having such a configuration will now be described.

The rotation detection means 80 detects the number of revolutions of the rotor r1 based on the position signal S3 output from the position detection means 10, and outputs the signal S10 representing the detected number of revolutions to the rotation determination means 90. Then, the rotation determination means 90 outputs, to the brake mode switching means 50B, the first brake mode switching signal S11a (corresponding to the "brake mode switching signal") and the second brake mode switching signal S11b (corresponding to the "brake mode switching signal") each having a signal level that transitions when the signal S10 from the rotation detection means 80 becomes less than or equal to a reference value corresponding to a predetermined number of revolutions. Moreover, the clock signal production means 100 outputs, to the brake mode switching means 50B, the clock signal S12 having a predetermined frequency and a predetermined duty ratio. When receiving the first and second brake mode switching signals S11a and S11b from the rotation determination means 90, the brake command signal S5 from the brake command generation means 40 and the clock signal S12 from the clock signal production means 100, the brake mode switching means 50B produces and outputs the reverse brake signal S7 (corresponding to the "brake mode command signal") and the short brake signal /S7 (corresponding to the "brake mode command signal"). When receiving the reverse brake signal S7 and the short brake signal /S7, the energization control signal production means 70A outputs the energization control signal S8 to the power transistors Q1 to Q6 according to the selected brake mode, based on the energization switching signal S4 and the brake command signal S5.

Figure 5:
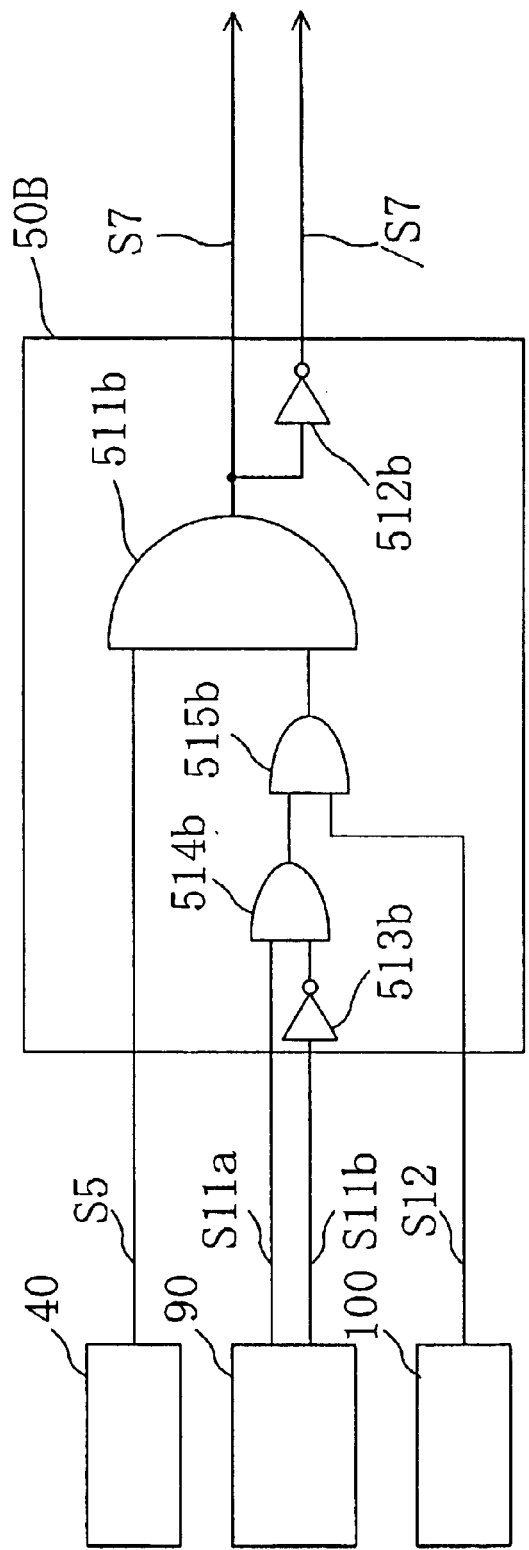
FIG. 5 is a diagram illustrating an internal configuration of brake mode switching means.

FIG. 5 is a diagram illustrating an internal configuration of the brake mode switching means 50B.

The brake mode switching means 50B illustrated in FIG. 5 includes AND circuits 511b, 514b and 515b, and inverters 512b and 513b. The inverter 513b inverts the second brake mode switching signal S11b from the rotation determination means 90. The AND circuit 514b outputs the logical product of the first brake mode switching signal S11a from the rotation determination means 90 and the output from the inverter 513b. The AND circuit 515b outputs the logical product of the output from the AND circuit 514b and the clock signal S12 from the clock signal production means 100. The AND circuit 511b outputs, as the reverse brake signal S7, the logical product of the brake command signal S5 from the brake command generation means 40 and the output from the AND circuit 515b. The inverter 512b inverts the reverse brake signal S7 from the AND circuit 511b and outputs the inverted signal as the short brake signal /S7.

Figure 6:
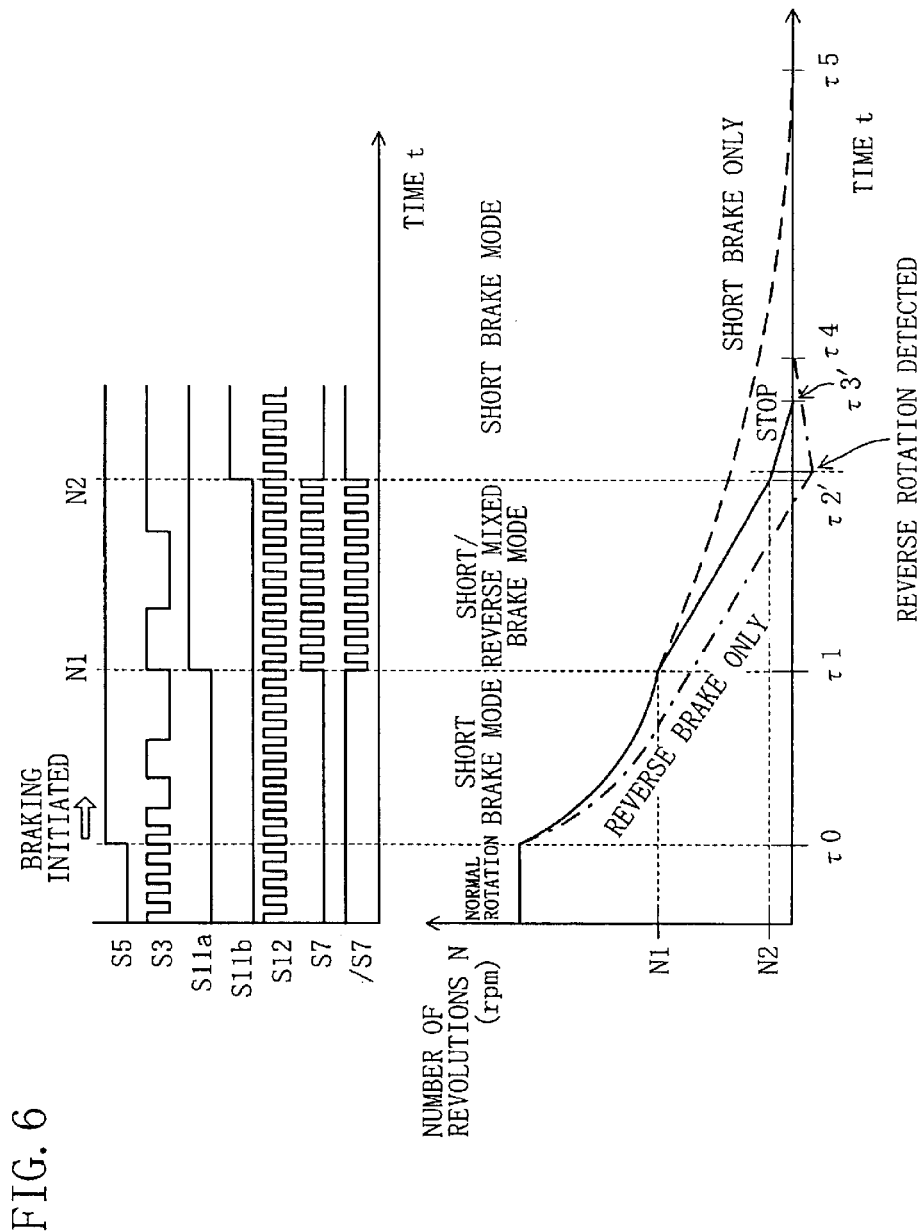
FIG. 6 is a timing chart illustrating a specific operation of a motor driving device.

FIG. 6 is a timing chart illustrating a specific operation of the motor driving device 1B of the present embodiment.

The brake mode switching signal production means 200 outputs the first brake mode switching signal S11a, which transitions to the H level when the number of revolutions of the motor M1 becomes less than or equal to a predetermined number of revolutions N1 (i.e., at time τ1), based on the position signal S3 from the position detection means 10. Similarly, the brake mode switching signal production means 200 outputs the second brake mode switching signal S11b, which transitions to the H level when the number of revolutions becomes less than or equal to a predetermined number of revolutions N2 (i.e., at time τ2'). Moreover, the clock signal production means 100 outputs the clock signal S12 having the predetermined frequency and the predetermined duty ratio to the brake mode switching means 50B. The brake mode switching means 50B outputs the reverse brake signal S7 and the short brake signal /S7, as illustrated in FIG. 6, based on the signals S11a and S11b from the rotation determination means 90, and the clock signal S12 from the clock signal production means 100.

Thus, as illustrated in FIG. 6, during a period from time τ0 at which braking is initiated to time τ1 at which the number of revolutions decreases to N1 (the number of revolutions during this period corresponds to the "first rotational speed"), the brake mode switching means 50B outputs the H-level short brake signal /S7 to the energization control signal production means 70A so as to select the short brake mode in which the noise level is low. Then, during the following period from time τ1 at which the number of revolutions is N1 (i.e., a somewhat decreased, intermediate value) to time τ2' at which the number of revolutions is N2 (i.e., immediately before coming to a complete stop) (the number of revolutions during this period corresponds to the "second rotational speed"), a mixed brake mode is selected, in which the low-noise short brake mode and the large-braking-force reverse brake mode are repeatedly switched from one to another based on the clock signal S12 from the clock signal production means 100. Then, during the next period from time τ2' at which the number of revolutions is N2 (i.e., immediately before the motor stops) to time τ3' at which the motor stops (the number of revolutions during this period corresponds to the "third rotational speed"), the brake mode switching means 50B outputs the H-level short brake signal /S7 to the energization control signal production means 70A so as to select the short brake mode by which the rotor r1 does not rotate in the reverse direction.

As illustrated in FIG. 6, the motor does not come to a complete stop until time τ4 or time τ5 if either the reverse brake mode or the short brake mode is selected throughout the braking operation as in the prior art. In contrast, according to the present embodiment, the stopping time is reduced to τ3'. Moreover, during high-speed rotation (from τ0 to τ1), the short brake mode is selected, whereby the noise is reduced as compared with that in a case where the reverse brake mode is selected as in the prior art. Furthermore, during low-speed rotation (from τ1 to τ2'), the two brake modes are repeatedly switched from one to another, thereby realizing a smooth brake mode transition. Moreover, immediately before coming to a complete stop (from τ2' to τ3'), the short brake mode is selected, whereby the rotor r1 can be stopped without reverse rotation, unlike when the reverse brake mode is selected as in the prior art.

As described above, the brake mode switching means 50B selectively uses the two brakes based on the first and second brake mode switching signal S11a and S11b from the rotation determination means 90. Therefore, it is possible to reduce the braking noise and the stopping time. Moreover, in this way, it is less likely that an error occurs in the position at which the motor M1 stops. Furthermore, the brake mode switching means 50B repeatedly switches the brake modes from one to another based on the clock signal S12 from the clock signal production means 100, thereby realizing a smooth brake mode transition. As a result, it is possible to reduce noise that may otherwise occur at the brake mode transition. Moreover, since the motor is brought to a complete stop by using the short brake, it is possible to save an amount of time that is required for detecting a reverse rotation as in the prior art where the motor is brought to a complete stop by using the reverse brake.

Note that in the present embodiment, the short brake mode and the reverse brake mode are switched from one to another based on the clock signal S12 from the clock signal production means 100, which transitions at regular intervals, as illustrated in FIG. 6. However, the present embodiment is not limited to this, but the present invention can similarly be applicable in cases where the frequency or the duty ratio is varied over time.

Moreover, while the present embodiment has been described with respect to a case where the mixed brake mode (where the short brake mode and the reverse brake mode are repeatedly switched from one to another) is selected during low-speed rotation (from τ1 to τ2'), the present embodiment is not limited to this, but the present invention can similarly be applicable in cases where the mixed brake mode is selected during a period immediately after time τ0 at which braking is initiated. In this way, the braking noise and the stopping time can be set arbitrarily.

Third Embodiment

Figure 7:
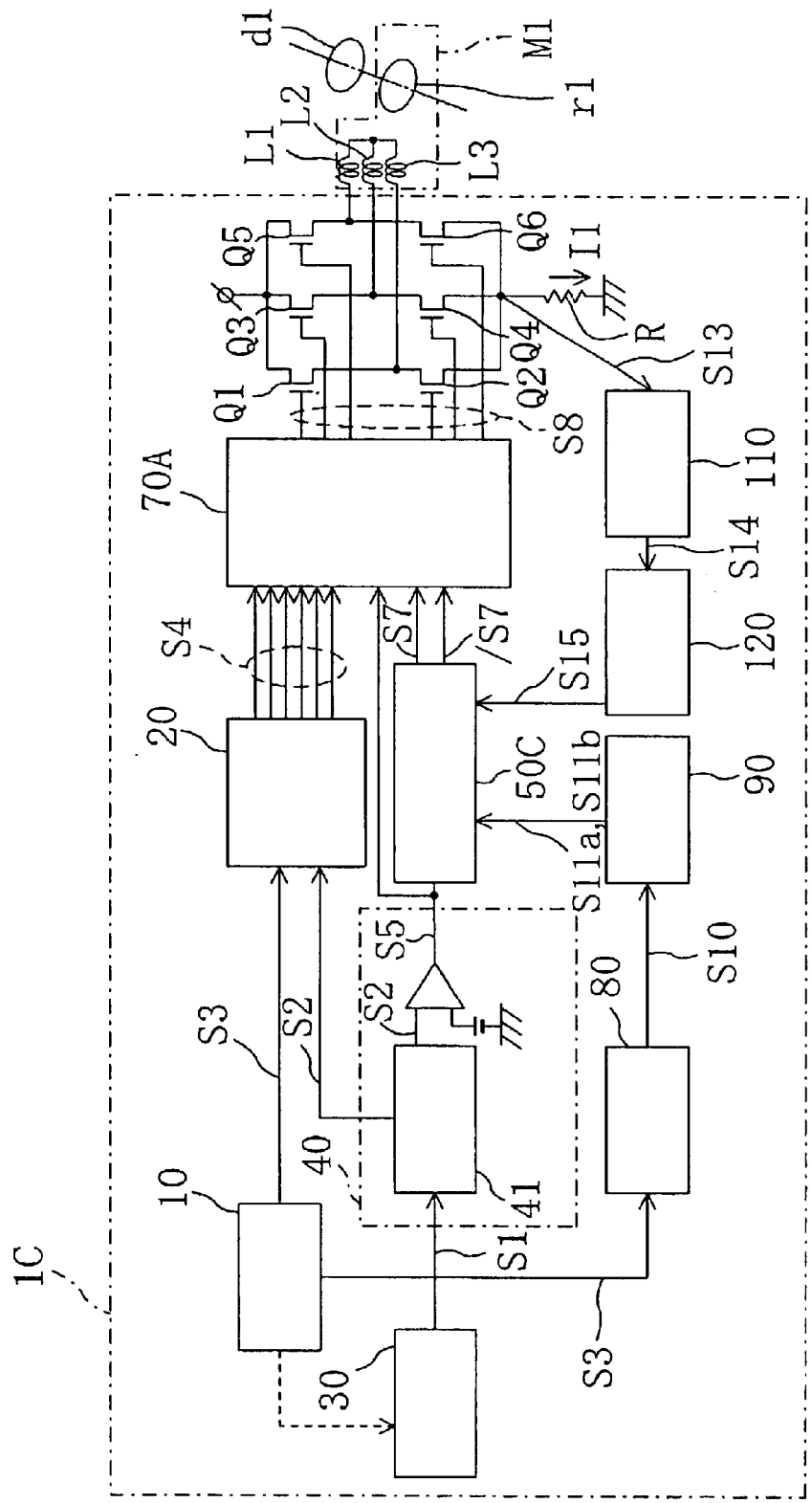
FIG. 7 is a diagram illustrating a configuration of a motor driving device according to a third embodiment of the present invention.

FIG. 7 is a diagram illustrating a configuration of a motor driving device 1C according to the third embodiment of the present invention.

In addition to the elements included in the motor driving device 1A illustrated in FIG. 1, the motor driving device 1C illustrated in FIG. 7 further includes current value detection means 110 and current value determination means 120. The current value detection means 110 receives a current value signal S13 representing the value of the current flowing through the motor windings L1 to L3 to detect the current value. The current value determination means 120 compares the current value based on a current value detection signal S14 from the current value detection means 110 with a predetermined current value (reference value) to output a current value determination signal S15 to brake mode switching means 50C.

The operation of the motor driving device IC having such a configuration will now be described.

For example, the current value detection means 110 detects the value of the current flowing through the motor M1 by detecting a voltage drop across a resistor R, which is inserted between the power transistors Q1 to Q6 and the ground, or between the power supply and the power transistors Q1 to Q6. The current value detected by the current value detection means 110 is output to the current value determination means 120 as the current value detection signal S14. When receiving the current value detection signal S14, the current value determination means 120 compares the current value detected by the current value detection means 110 with the predetermined current value to output the current value determination signal S15 whose signal level transitions when the value of the current flowing through the motor M1 becomes smaller than the predetermined current value. Moreover, when receiving the brake command signal S5 output from the brake command generation means 40, the brake mode switching means 50C outputs the reverse brake signal S7 (corresponding to the "brake mode command signal") and the short brake signal /S7 (corresponding to the "brake mode command signal"), based on the first brake mode switching signal S11a (corresponding to the "brake mode switching signal") and the second brake mode switching signal S11b (corresponding to the "brake mode switching signal") from the rotation determination means 90 and the current value determination signal S15 from the current value determination means 120.

Thus, according to the present embodiment, the brake mode switching means 50C has a logic circuit configuration (not shown) such that the short brake mode is selected from the beginning of the braking operation until when the value of the current flowing through the motor M1 becomes less than or equal to a predetermined current value I1, for example, the reverse brake mode is selected from when the current value reaches I1 until when the number of revolutions reaches N2, and the short brake mode in which the rotor r1 does not rotate in the reverse direction is selected from when the number of revolutions reaches N2 until when the motor comes to a complete stop. Thus, the brake mode switching means 50C outputs, to the energization control signal production means 70A, the reverse brake signal S7 and the short brake signal /S7 each having a signal level that transitions when the brake mode is selected.

As a result, during the period from the beginning of the braking operation until when the current value reaches I1, the supply current can be shut down while suppressing the noise level. During the period from when the current value reaches I1 until when the number of revolutions reaches N2, a large braking force is provided, thereby shortening the amount of time that is required for the motor M1 to come to a complete stop. During the period from when the number of revolutions reaches N2 until when the motor M1 comes to a complete stop, the short brake mode is selected, whereby the motor M1 stops naturally, and it is not necessary to detect a reverse rotation as is in the prior art.

As described above, with the motor driving device 1C of the present embodiment, the brake mode switching means 50C selectively uses the two brake modes based on the first and second brake mode switching signals S11a and S11b from the rotation determination means 90 and the current value determination signal S15 from the current value determination means 120. Therefore, it is possible to reduce the braking noise and the stopping time. Moreover, in this way, it is less likely that an error occurs in the position at which the motor M1 stops. Furthermore, by braking the motor M1 with the short brake, in which the supply current is shut down according to the current value of the motor M1, it is possible to control the power consumption according to the value of the current flowing through the motor M1. Moreover, since the motor is brought to a complete stop by using the short brake, it is possible to save an amount of time that is required for detecting a reverse rotation as in the prior art where the motor is brought to a complete stop by using the reverse brake.

Note that the clock signal production means 100 of the second embodiment may be used in the present embodiment. Specifically, the short brake mode and the reverse brake mode may be repeatedly switched from one to another based on the clock signal S12 output from the clock signal production means 100 during the period from when the current value reaches I1 until when the number of revolutions reaches N2. In this way, the brake mode transition is made more smoothly, and the noise occurring at the brake mode transition is reduced, in the present embodiment.

Fourth Embodiment

Figure 8:
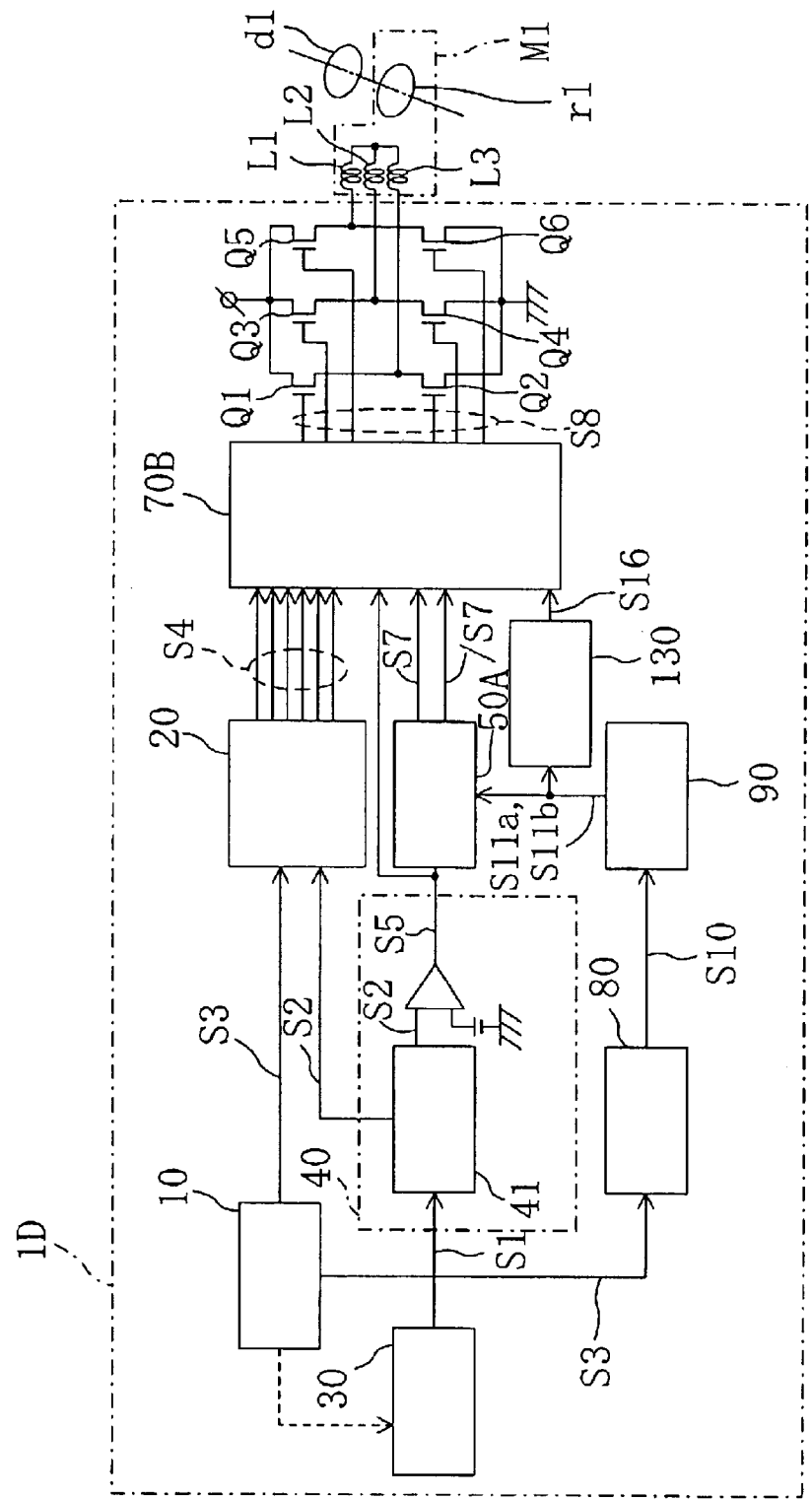
FIG. 8 is a diagram illustrating a configuration of a motor driving device according to a fourth embodiment of the present invention.
Figure 9:
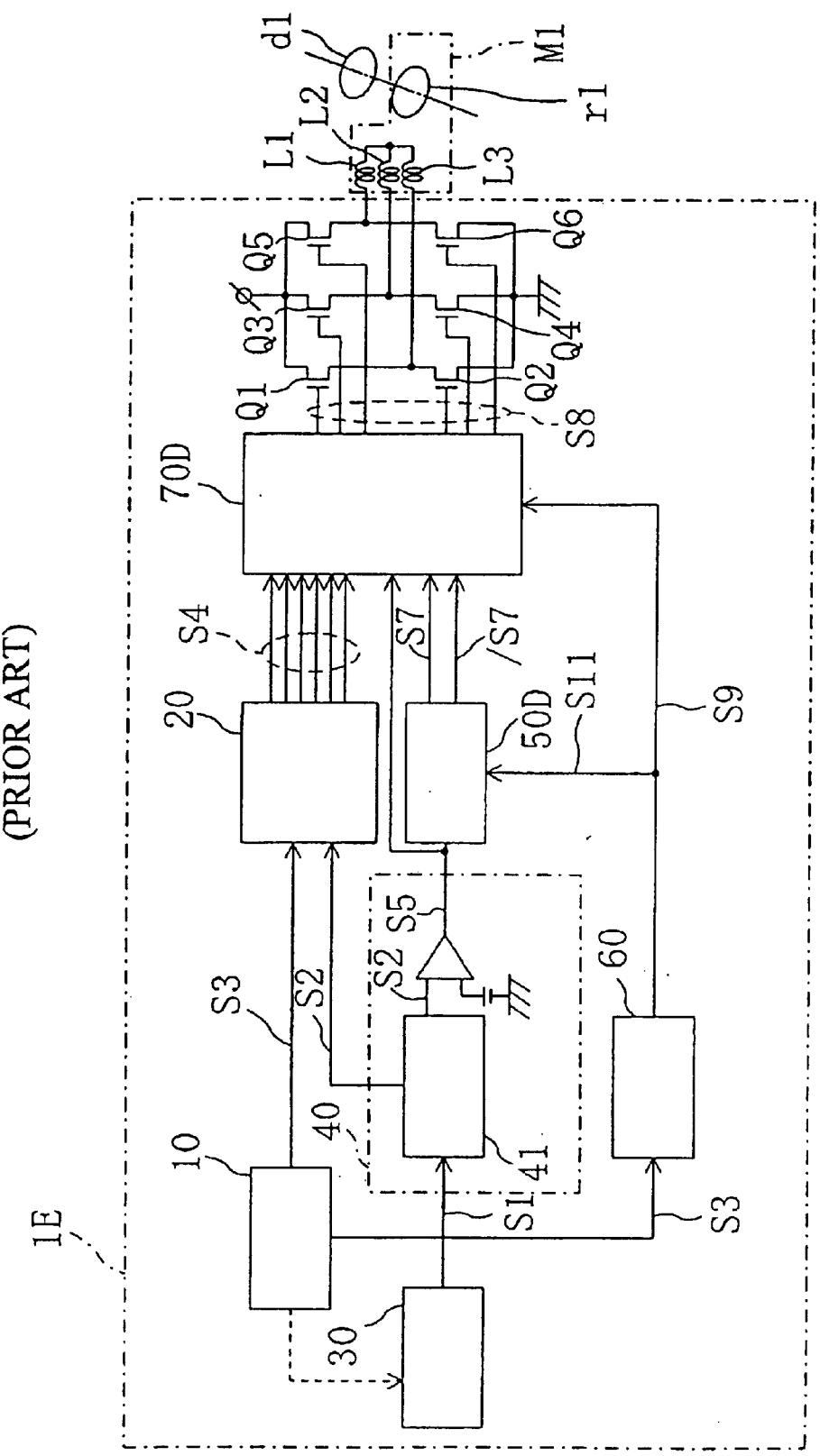
FIG. 9 is a diagram illustrating a configuration of a conventional motor driving device.
Figure 10:
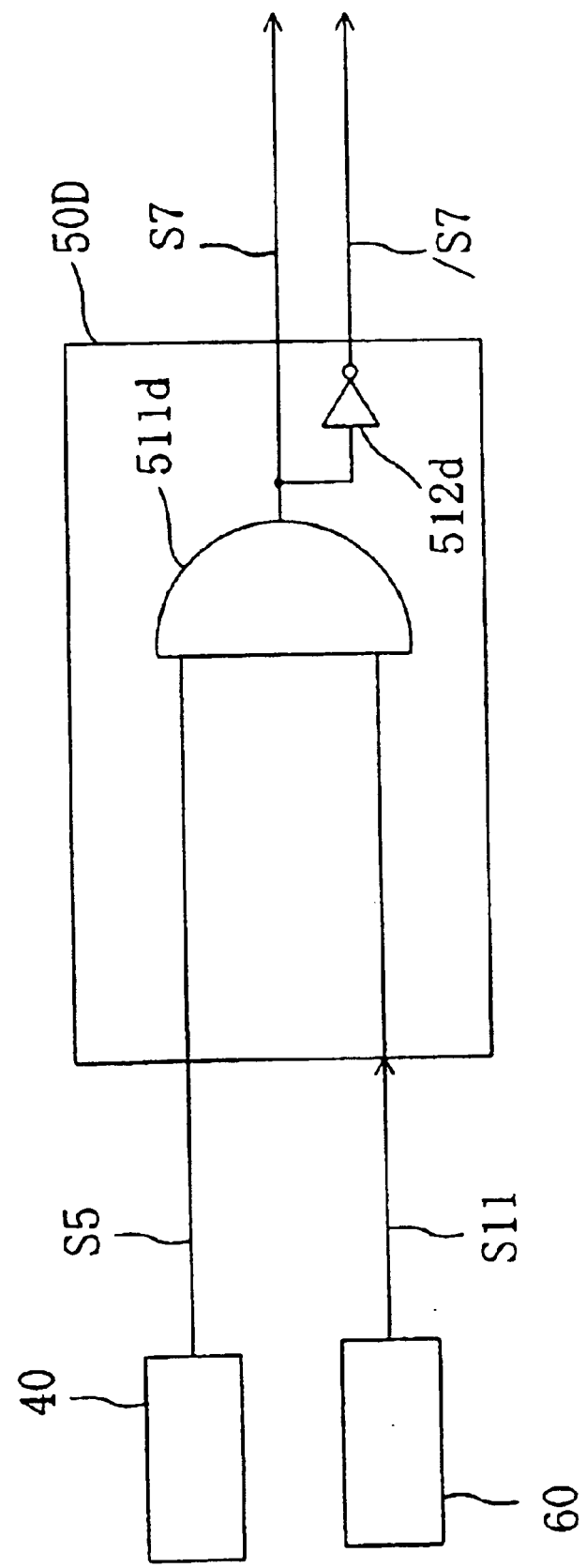
FIG. 10 is a diagram illustrating an internal configuration of conventional brake mode switching means.

FIG. 8 is a diagram illustrating a configuration of a motor driving device 1D according to the fourth embodiment of the present invention.

In addition to the elements included in the motor driving device 1A illustrated in FIG. 1, the motor driving device ID illustrated in FIG. 8 further includes OFF signal production means 130. When receiving the first brake mode switching signal S11a (corresponding to the "brake mode switching signal") and the second brake mode switching signal S11b (corresponding to the "brake mode switching signal"), the OFF signal production means 130 outputs an OFF signal S16 to energization control signal production means 70B. The OFF signal S16 is a one-shot pulse having a predetermined cycle, with which the current supply to the motor windings L1 to L3 is temporarily turned OFF.

The operation of the motor driving device 1D having such a configuration will now be described.

When receiving the first and second brake mode switching signals S11a and S11b output from the rotation determination means 90, the brake mode switching means 50A outputs the reverse brake signal S7 (corresponding to the "brake mode command signal") and the short brake signal /S7 (corresponding to the "brake mode command signal"). Moreover, when receiving the first and second brake mode switching signals S11a and S11b, the OFF signal production means 130 outputs the OFF signal S16 for a predetermined period of time to the energization control signal production means 70B. When receiving the OFF signal S16, the energization control signal production means 70B temporarily stops the supply of the energization control signal S8, which is output based on the brake command signal S5, the reverse brake signal S7, the short brake signal /S7 and the energization switching signal S4 output from the energization switching signal production means 20.

More specifically, the rotation determination means 90 outputs the first brake mode switching signal S11a whose signal level transitions when the number of revolutions represented by the signal S10 from the rotation detection means 80 becomes less than or equal to N1. When receiving the first brake mode switching signal S11a, the brake mode switching means 50A outputs the H-level reverse brake signal S7. On the other hand, when receiving the first brake mode switching signal S11a, the OFF signal production means 130 outputs the OFF signal (one-shot pulse) S116 for a predetermined period of time to the energization control signal production means 70B when the reverse brake signal S7 is output from the brake mode switching means 50A. When receiving the brake command signal S5, the reverse brake signal S7 and the OFF signal S16, the energization control signal production means 70B produces the energization control signal S8 such that the current supply to the motor windings L1 to L3 based on the energization switching signal S4 from the energization switching signal production means 20 is temporarily turned OFF for a predetermined period of time when switching from the short brake mode to the reverse brake mode. Note that the cycle of the OFF signal S16 is preferably set to be slightly longer than the turn-OFF time of the power transistors Q1 to Q6.

In this way, when receiving the OFF signal S 16, the energization control signal production means 70B temporarily turns OFF all of the power transistors Q1 to Q6, thereby preventing a through current from occurring at the brake mode transition.

As described above, with the motor driving device 1D of the present embodiment, the brake modes are switched from one to another by the brake mode switching means 50A, while the energization control signal production means 70B supplies, to the power transistors Q1 to Q6 for supplying a current through the motor windings L1 to L3, the energization control signal S8 for turning OFF the power transistors Q1 to Q6 for a predetermined period of time. Therefore, it is possible to prevent a through current from occurring through the power transistors Q1 to Q6 at the brake mode transition.

Note that the OFF signal production means 130 of the present embodiment may be used in the motor driving devices 1B and 1C of the second and third embodiments. With the second embodiment, the OFF signal production means 130 may output the OFF signal S16 based on the clock signal S12 from the clock signal production means 100, whereby it is possible to prevent a through current at the brake mode transition. With the third embodiment, the OFF signal S16 may be output based on the current value determination signal S15 from the current value determination means 120 and the first and second brake mode switching signals S11a and S11b from the rotation determination means 90, whereby it is possible to prevent a through current at the brake mode transition.

Note that in the first to fourth embodiments described above, each of the power transistors Q1 to Q6 may be either an NPN transistor or a PNP transistor, and may be any of various types of transistors such as a bipolar transistor or a MOS transistor. Furthermore, instead of the rotation detection means 80 receiving the position signal S3 from the position detection means 10, an alternative element that is capable of directly detecting the number of revolutions of the motor M1 (e.g., a Hall element) may be provided, separately from the position detection means 10, for detecting the number of revolutions of the motor M1.

With the motor driving device of the present invention, the brake modes can be switched from one to another according to the number of revolutions of the motor. Therefore, it is possible to reduce the braking noise and the stopping time. Moreover, in this way, it is less likely that an error occurs in the position at which the motor stops.

What is claimed is:

1. A motor driving device, comprising:

position detection means for outputting a position signal representing a positional relationship between motor windings of a plurality of phases and a rotor;

rotation detection means for outputting a detection signal according to a number of revolutions per unit time of the rotor;

rotation control means for outputting a rotation control signal for controlling rotation of the rotor;

brake command generation means for outputting a torque command signal according to the rotation control signal upon receiving the rotation control signal and for outputting a brake command signal for applying a short brake or a reverse brake to the rotation of the rotor;

energization switching signal production means for outputting an energization switching signal having a level according to that of the torque command signal for energizing the motor windings of a plurality of phases with an energization angle that is determined based on the position signal;

rotation determination means for comparing the number of revolutions per unit time detected by the rotation detection means with a predetermined number of revolutions, by using signals that are equivalent to the numbers of revolutions, to output a brake mode switching signal for selecting either the short brake or the reverse brake;

brake mode switching means for selecting either one of the brake modes based on the brake command signal and the brake mode switching signal and outputting a brake mode command signal indicating selected brake mode;

energization control signal production means for outputting an energization control signal for controlling energization of the motor windings of a plurality of phases based on the brake command signal, the brake mode command signal and the energization switching signal; and a plurality of transistors for supplying a power to the motor windings of a plurality of phases according to the energization control signal.

2. The motor driving device of claim 1, further comprising clock signal production means for producing a clock signal having a predetermined frequency and a predetermined duty ratio, wherein the brake mode switching means further receives the clock signal to output the brake mode command signal based also on the clock signal.

3. The motor driving device of claim 1 or 2, further comprising:

current value detection means for detecting a value of a current flowing through the motor windings of a plurality of phases; and current value determination means for comparing a detection signal from the current value detection means with a predetermined reference value to output, to the brake mode switching means, a current value determination signal whose signal level transitions according to the comparison result, wherein the brake mode switching means outputs the brake mode command signal at a timing that is determined according to the current value determination signal.

4. The motor driving device of any one of claim 1, further comprising OFF signal production means for outputting an OFF signal, which is a pulse having a predetermined cycle, when receiving the brake mode switching signal, wherein when receiving the OFF signal output from the OFF signal production means, the energization control signal production means outputs an energization control signal to the plurality of transistors for temporarily stopping a current supply to the motor windings of a plurality of phases according to the OFF signal.

5. A motor driving method, comprising:

motor windings of a plurality of phases;

a rotor;

a plurality of transistors for driving the motor windings of a plurality of phases; and a control circuit for detecting a number of revolutions per unit time of the rotor according to a change in a positional relationship between the motor windings of a plurality of phases and the rotor so as to control a braking operation of the plurality of transistors, wherein the control circuit performs a short brake control of shorting terminals of the motor windings of a plurality of phases with one another while a rotational speed of the rotor is a first rotational speed, a reverse brake control of applying a reverse driving current to the motor windings of a plurality of phases while the rotational speed of the rotor is a second rotational speed that is lower than the first rotational speed, and then the short brake control again while the rotational speed of the rotor is a third rotational speed that is lower than the second rotational speed.

6. A motor driving method, comprising:

motor windings of a plurality of phases;

a rotor;

a plurality of transistors for driving the motor windings of a plurality of phases; and a control circuit for detecting a number of revolutions per unit time of the rotor according to a change in a positional relationship between the motor windings of a plurality of phases and the rotor so as to control a braking operation of the plurality of transistors, wherein the control circuit performs a short brake control of shorting terminals of the motor windings of a plurality of phases with one another while a rotational speed of the rotor is a first rotational speed, a mixed brake control in which the short brake control and a reverse brake control of applying a reverse driving current to the motor windings of a plurality of phases are repeatedly switched from one to another based on a clock signal having a predetermined cycle and a predetermined duty ratio while the rotational speed of the rotor is a second rotational speed that is lower than the first rotational speed, and then the short brake control again while the rotational speed of the rotor is a third rotational speed that is lower than the second rotational speed.

7. The motor driving method of claim 5 or 6, wherein a one-shot pulse is generated when switching the short brake control and the reverse brake control from one to another for turning OFF all of the plurality of transistors according to the one-shot pulse.

* * * * *